United States Patent [19]
Bosten et al.

[11] Patent Number: 5,375,495
[45] Date of Patent: * Dec. 27, 1994

[54] OPTICAL ALIGNMENT SYSTEM FOR CIRCULAR POWER SAWS

[75] Inventors: Donald R. Bosten; John R. Kriaski; John W. Schnell; James P. Nichols, Jr., all of Jackson, Tenn.; Steven H. Plume, St. Charles, Mo.; Matthew G. Popik; Dennis C. Huntsman, both of Jackson, Tenn.; Randy G. Cooper, Milan, Tenn.; David V. Keller, Jackson, Tenn.

[73] Assignee: Porter-Cable Corporation, Jackson, Tenn.

[*] Notice: The portion of the term of this patent subsequent to Feb. 15, 2011 has been disclaimed.

[21] Appl. No.: 63,518

[22] Filed: May 18, 1993

Related U.S. Application Data

[63] Continuation-in-part of Ser. No. 885,313, May 18, 1992, Pat. No. 5,285,708.

[51] Int. Cl.⁵ .......................... B26D 7/00; B27B 5/20; B27B 9/00
[52] U.S. Cl. .................................... 83/520; 83/471.3; 83/490; 30/388; 362/89
[58] Field of Search ....................... 83/520, 521, 471.3, 83/478, 490, 397; 362/89, 259, 287; 30/388, 390, 391

[56] References Cited

U.S. PATENT DOCUMENTS

| | | |
|---|---|---|
| 1,476,238 | 12/1923 | Bump . |
| 1,804,764 | 5/1931 | Grant . |
| 2,307,820 | 1/1943 | Butters . |
| 2,357,194 | 8/1944 | Hazelton et al. . |
| 2,488,947 | 11/1949 | Vavrik . |
| 2,806,492 | 9/1957 | Becker . |
| 4,257,297 | 3/1981 | Nidbella . |
| 4,413,662 | 11/1983 | Gregoire et al. . |
| 4,503,740 | 3/1985 | Brand et al. . |
| 4,676,130 | 6/1987 | Nutt . |
| 4,725,933 | 2/1988 | Houk . |
| 4,805,500 | 2/1989 | Saito et al. . |
| 4,817,839 | 4/1989 | Weissman . |
| 4,833,782 | 5/1989 | Smith . |
| 4,885,965 | 12/1989 | Weissman . |
| 4,885,967 | 12/1989 | Bell et al. . |
| 4,887,193 | 12/1989 | Dieckmann . |
| 4,934,233 | 6/1990 | Brundage et al. . |
| 4,945,797 | 8/1990 | Hahn . |
| 5,038,481 | 8/1991 | Smith . |

OTHER PUBLICATIONS

"Product Picks from the National Hardware Show" *Fall Homes 1992*, Sep. 23, 1992.
"Delta, Building Trades and Home Shop Machinery", published Jan.1993, (see generally pp. 5-25).

*Primary Examiner*—Eugenia Jones
*Attorney, Agent, or Firm*—Merchant, Gould Smith, Edell, Welter & Schmidt

[57] ABSTRACT

An optical system for projecting an alignment marker on to a workpiece relative to the circular blade of a power saw. The light projection system projects a planar beam of light along a plane defined by one side of the blade to designate the location at which that side of the blade will enter the workpiece. An adjustment mechanism may be included to allow movement of the light projection system so that the planar beam of light can be selectively located parallel to the plane defined by either side of the blade.

21 Claims, 7 Drawing Sheets

OPTICAL ALIGNMENT SYSTEM FOR CIRCULAR POWER SAWS This application is a continuation-in-part of application Ser. No. 07/885,313, entitled MITER SAW, filed May 18, 1992, U.S. Pat. No. 5,285,708.

FIELD OF THE INVENTION

The present application relates to a power saw with an optical alignment system, and more particularly, to a circular saw with an optical system for projecting an optical alignment marker onto a workpiece.

BACKGROUND OF THE INVENTION

In order to align the blade of a power saw with a cutting line on a workpiece, the operator must typically bring the blade into contact with the workpiece to determine if the saw is properly aligned with the cutting line. As is familiar to those skilled in the art, it may be necessary to repeat this procedure several times in order to achieve proper alignment for precision cutting. This procedure is time consuming, and the desired precision is often not achieved, resulting in wasted time and materials.

Moreover, circular saw blades have a discrete width. If the blade is centered over the cutting line, more material than required will be removed. For example, if the blade is centered directly over the cutting line, the cut in the workpiece will be inaccurate by an amount approximately equal to half the width of the blade. The cutting line, which is generally a pencil mark, or scribe mark on the workpiece, also has a discrete width, further complicating alignment. Consequently, it is often difficult to determine precisely where the blade will engage the cutting line.

U.S. Pat. No. 4,257,297, issued to Nidbella on Mar. 24, 1981 discloses a power saw where the blade is interposed between an incandescent bulb and the workpiece. The blade interrupts the light and casts a shadow onto the workpiece generally showing the edges of the blade. However, circular blades are typically out of flatness by 0.005–0.015", causing the shadow to inaccurately reflect where the blade will engage the workpiece. Moreover, the teeth on circular blades are often angled away from the plane of the blade, creating a jagged-edged shadow. This drawback is also present in blades having carbide tips wider than the body of the blade. Therefore, the overall accuracy of shadow system is inadequate for precision woodworking.

SUMMARY OF THE INVENTION

The present invention relates to a power saw with an optical system for projecting an optical alignment marker onto a workpiece.

The optical system comprises a light projection system which is attached to the power saw. An optical alignment marker is projected onto the workpiece so that the location at which the blade engages the workpiece is in a selectively adjustable relationship with respect to the position of the alignment marker on the workpiece. The optical system may be used with any power saw utilizing a circular cutting blade. Such saws include table saws, miter saws, compound or slide miter saws, cutoff saws, hand-held circular saws, and radial arms saws.

The light projection system is preferably attached to the power saw and projects a planar beam of light having a thickness and two sides past one side of the blade onto the workpiece in order to form a linear alignment marker on the workpiece. The light projection system includes an adjustment mechanism for adjusting the alignment marker so that the side of the alignment marker facing the blade is coincident with the plane defined by the maximum projection of one side of the blade, whereby the alignment marker indicates the location at which the maximum projection of that side of the blade will enter the workpiece.

The light projection system is preferably attached to the upper blade guard of the power saw so that the spatial relationship between the blade and the alignment marker remains constant, regardless of the orientation of the power saw.

In another embodiment, the adjustment mechanism for the light projection system allows for selectively adjusting the alignment marker so that the side of the alignment marker is coincident with a plane defined by a selected side of the blade, whereby the side of the linear alignment marker designates the location at which the selected side of the blade will enter the workpiece.

In yet another embodiment, the light projection system generates a non-linear alignment marker which is adjusted so that a portion of the alignment marker is coincident with plane defined by one side of the blade.

DETAILED DESCRIPTION OF THE PREFERRED EMBODIMENT

The present invention is directed to a power saw with an optical system for projecting an optical alignment mark onto a workpiece. The light projection system of the present invention is intended to be compatible with any power saw utilizing a circular blade, including table saws, miter saws, compound and slide miter saws, cutoff saws, frame and trim saws, radial arm saws, or hand-held circular saws. Although the two specific examples set forth in this application are directed to a miter saw and a hand-held circular saw, they are only intended as examples which in no way limit the scope of the claimed invention. Some of the possible circular saws with which the present light projection system is compatible are set forth in a catalog entitled "DELTA, Building Trades and Home Shop Machinery", published January 1993, which is hereby incorporated by reference as if fully set forth herein (see generally pages 5-25).

Figure 1:
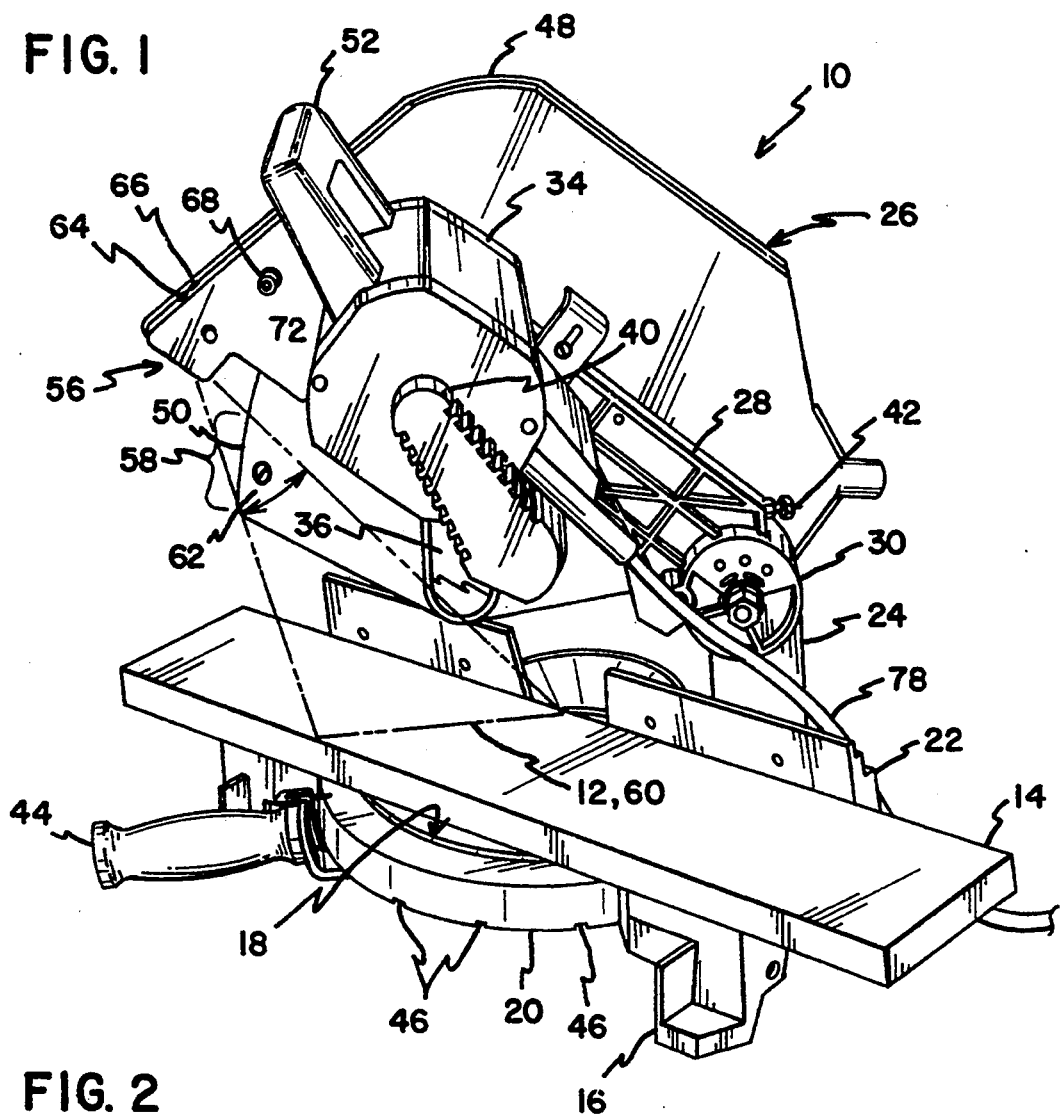
FIG. 1 illustrates a perspective view of a preferred miter saw with an optical alignment marker.

FIG. 1 illustrates a miter saw 10 with a preferred optical alignment marker 12 projected onto a workpiece 14. While FIG. 1 illustrates the preferred linear optical alignment marker 12, it will be understood from the discussion below that the optical alignment marker may be of a wide variety of configurations. The miter saw 10 preferably comprises a base 16 having a work surface 18 for supporting the workpiece 14. A turntable 20 is rotatably supported by the base 16. A fence 22 is disposed above the base 16 for supporting the orientation of the workpiece 14 located on the base 16. A support 24 is coupled by conventional means to the rear portion of the turntable 20.

The miter saw 10 shown in FIG. 1 further comprises a cutting apparatus 26 for cutting the workpiece 14. The cutting apparatus 26 generally comprises a support arm 28 coupled to the support 24 by a support coupling 30 for positioning the cutting apparatus 26 between a raised, rest position and a lowered, operational position. A support spring 32 (See FIG. 4) is enclosed within the support coupling 30 for biasing the cutting apparatus 26 to the raised, rest position. A motor 34 is connected to a blade 36 by an adjustable pulley system 38 (See FIG. 5), which is concealed behind a belt housing 40. A cutter travel screw 42 is used to establish the maximum travel of the blade 36. A power cord 78 is provided for powering the motor 34.

In its preferred configuration, the miter saw 10 will cut any angle from a 90° cut to 47° right or left. To adjust the angle of cut, a turntable handle 44 is loosened, enabling the turntable 20 to be set at a particular angle relative to the fence 22. The miter saw 10 is preferably equipped with positive stops 46 at various intervals in order to more securely retain the turntable 20 at particular angles.

The blade 36 is protected by a fixed upper blade guard 48 and a movable lower blade guard 50. When a cut is made to a workpiece 14, the lower blade guard 50 automatically moves upward in order to expose the blade 36 to the workpiece 14. The lower blade guard 50 rotates about a pivot located on the inside surface of the upper blade guard 48 (not shown). To operate the saw 14, the operator grasps a handle 52 and presses a trigger 54 (see FIG. 4) to activate the miter saw 14. The operator then presses the cutting apparatus 26 downward into the workpiece 14 so that the lower blade guard 50 is retracted and the blade 36 engages the workpiece 14.

Those skilled in the art will recognize that many configurations of motorized miter saws are possible, including changes to the base, turntable, motor arrangements, guard arrangements, linkage arrangements, dimensions, and the like. The general configuration of the miter saw 10 illustrated in FIG. 1 is set forth by way of example only.

FIG. 1 also illustrates portions of the preferred light projection system 56 of the present alignment invention. The light projection system 56 is preferably mounted in the front portion of the upper guard 48 so as to minimize the amount of sawdust and other debris coming in contact with the system 56. In the preferred embodiment, the lower blade 50 guard has a slit 58 in the front portion to allow the optical alignment marker 12 to pass unobstructed to the workpiece 14. However, it will be understood by those skilled in the art that a number of configurations are possible for orienting the light projection system 56 of the present alignment invention. In particular, the light projection system 56 may be attached to any suitable surface on a miter saw.

Attaching the light projection system 56 to the upper blade guard 48 insures that the optical alignment marker 12 will always indicate the location where at least one side of the blade will enter the workpiece, regardless of the orientation of the blade. This feature is important for compound or slide miter saws which permit the cutting apparatus to be oriented to virtually any position with regard to the workpiece. In any saw incorporating the present optical alignment system, the mounting location of the system (e.g., a blade guard) must be securely retained to the saw system so that an adjustable, but definite relationship is created between the alignment marker and the saw blade.

Figure 8A:
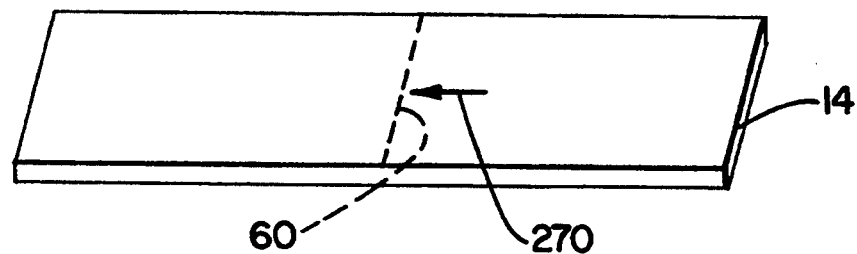
FIGS. 8A–8C illustrate three possible alternate alignment marker configurations.
Figure 8B:
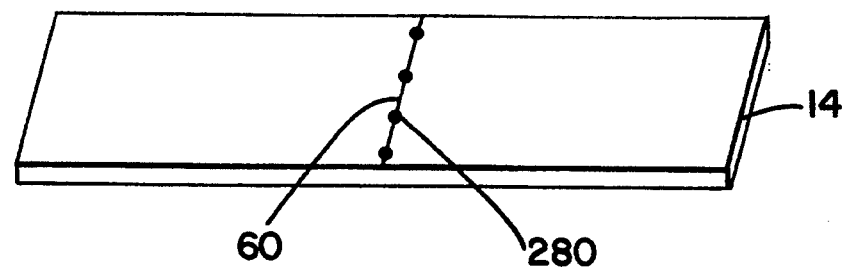

The preferred optical alignment marker 12 of the present alignment invention is of a generally linear configuration substantially parallel to the blade. The optical alignment marker 12 is preferably a beam of coherent visible light having a width, for example, of 0.030". This configuration allows the operator to align the optical alignment marker 12 in a predetermined relationship with a cutting line 60 on the workpiece 14. However, it will be understood that a variety of optical alignment marker configurations are possible. For example, FIG. 8A illustrates an optical alignment marker 270 configured as an arrow directed to the cutting line 60 on the workpiece 14 showing the location where one side of the blade will enter the workpiece. FIG. 8B illustrates an optical alignment marker 270 configured as a series of dots along the cutting line 60 on the workpiece 14.

Figure 8C:
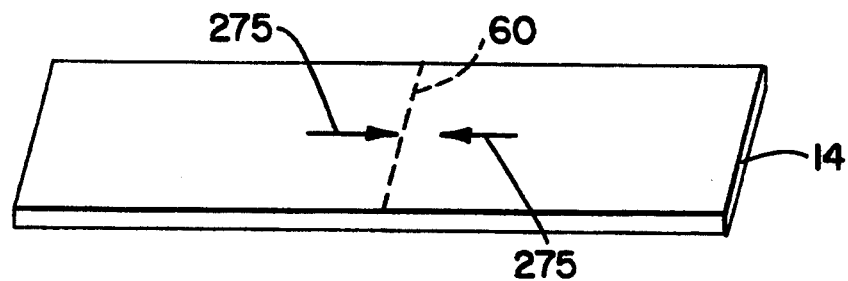

In yet another embodiment illustrated in FIG. 8C, a pair of arrows 275 could be projected onto the workpiece 14 which identify where each side of the blade will enter the workpiece. Because the light projection system 56 projects the alignment marker 12 parallel to the side of the blade, an optical off-setting mechanism, such as a pair of mirrors, may be employed to offset one of the arrows the width of the blade 36 so that each arrow is projected parallel to one side of the blade. The location of the mirrors are preferably adjustable to compensate for different width blades.

The linear alignment marker 12 has a fan angle 62 which is preferably determined so that its length generally corresponds to the distance from the front to the rear of the turntable 20, when the cutting apparatus 26 is in the raised position. For applying the present system to circular saws in general, the optical alignment system is located so that it projects a beam of light past the selected side of the blade for alignment with a plane defined by that side of the blade and onto a suitable portion of the workpiece. In the preferred embodiment discussed herein, a line generator creates a fan angle of coherent laser light of approximately 35°, plus or minus 5° to insure that the linear alignment marker 12 will be focused generally on the workpiece 14.

The preferred light projection system 56 of the alignment invention has two sensor lights, 64, 66, preferably on the front of the upper guard 48, although the sensor may be located on any suitable surface. The first sensor light 64 is preferably green and indicates that the light projection system 56 is operating. In the preferred embodiment, the light projection system 56 and the first sensor light 64 are continuously activated whenever the miter saw 14 is plugged into an electrical outlet, thereby signaling to the user that the saw 14 is plugged-in. It will be understood that the light projection system 56 may alternatively be activated/deactivated by a switch or attenuated by some mechanical means.

The second sensor light 66 is preferably red and indicates that the light projection system 56 has shut off due to a high temperature or a low temperature condition. In the preferred light projection system 56 of the present alignment invention, the red shut off light is triggered when the ambient temperature is below −10° C. or above 48° C.

As will be discussed in detail below, the light projection system 56 is preferably equipped with a series of adjustments for selectively adjusting the relationship of the blade 36 with respect to the position of the optical alignment marker 12 on the workpiece 14. FIG. 1 illustrates the preferred lateral adjustment mechanism, which comprises a right push knob 68 and left push knob 70 (See FIG. 3). Lateral movement of the light projection system is preferably limited by an upper end stop 72 (shown in FIG. 1) and an end stop (not shown) on each side of the upper blade guard 48.

Figure 2:
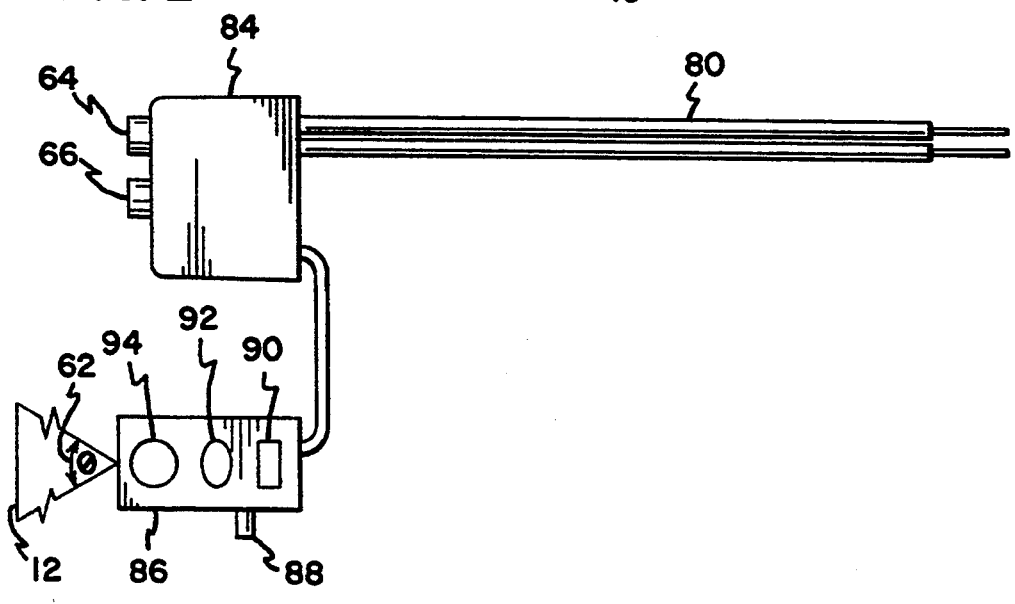
FIG. 2 illustrates the preferred laser source for generating the optical alignment marker.

FIG. 2 illustrates the electrical portion of the preferred light projection system 56 of the present alignment invention. A transformer (not shown) connected to the main power cord 78 converts standard house current (110 volts AC) to preferably 5 volts (DC). The transformer is connected by wires 80 to the control electronics (not shown), which are contained within a sealed control box 84. The first and second sensor lights, 64, 66, discussed above, are mounted to the control box 84. A laser barrel 86 with a pivot pin 88 contains a laser source 90, which is connected to the control electronics.

The laser 90 is preferably a visible laser diode with 5.0 milliwatts maximum output and a wavelength of 620 to 680 nanometers. Government regulations require that the laser comply with FDA 21 CFR 1040.10 and 1040.11 class IIIA laser products. It will be understood by those skilled in the art that a variety of light projection systems 56 are possible, and that it is possible to use a non-coherent light source. It will also be understood by those skilled in the art that in order to generate the preferred linear alignment marker 12, the coherent laser light from the laser preferably passes through a lens 92, which generates a point source of light. The point source of coherent laser light then passes through a spherical line generator 94 to generate the generally linear alignment marker 12.

Figure 3:
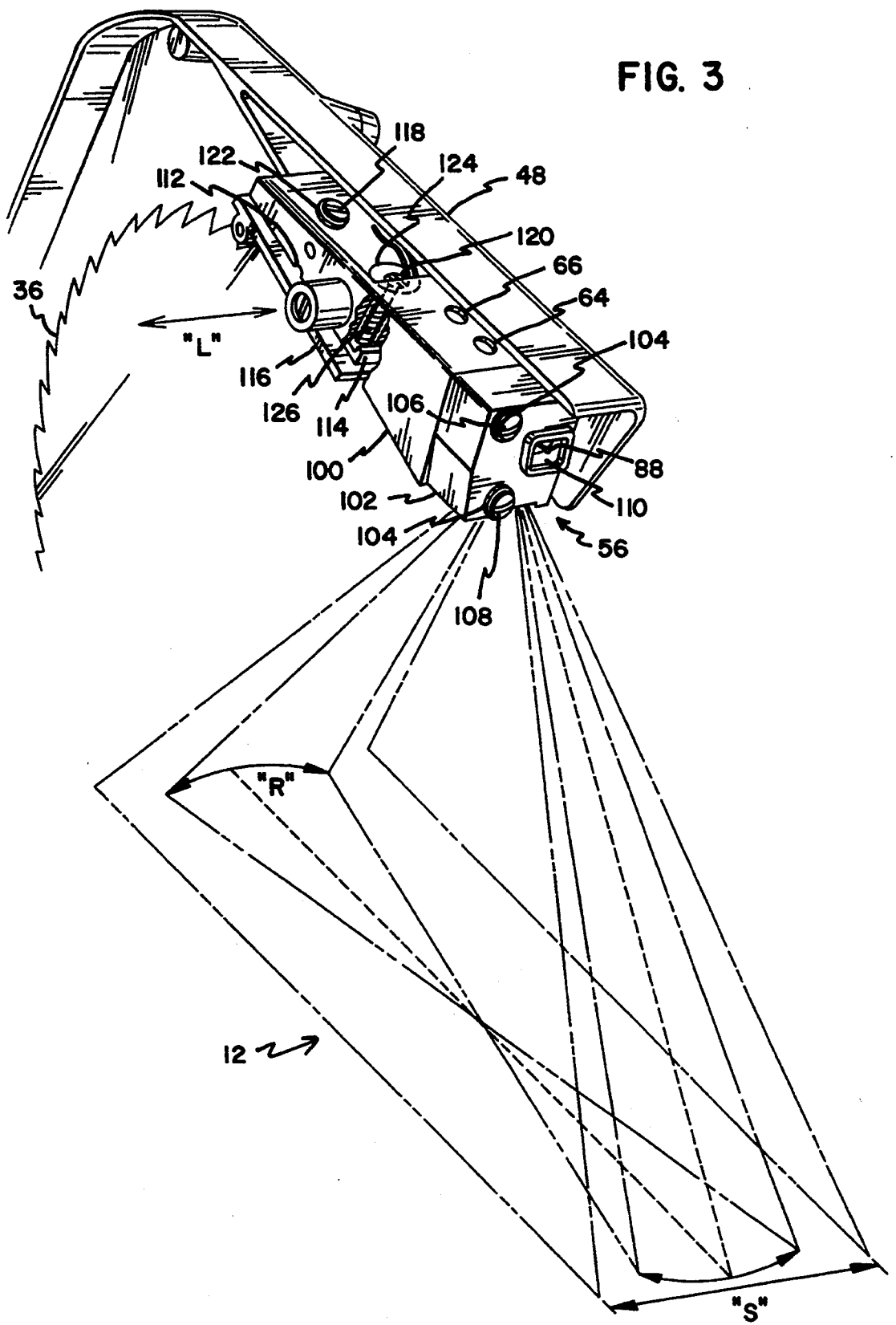
FIG. 3 illustrates a preferred adjustment system for adjusting the orientation of the light projection system of the present alignment invention.

FIG. 3 illustrates the preferred adjustment mechanism 96 for adjusting the spacial relationship between the optical alignment marker 12 and the blade 36. The light projection system 56 is substantially contained within a housing 100 which is mounted in the front portion of the upper blade guard 48. The laser barrel 86 (See FIG. 2) is mounted behind a laser assembly cap 102 and is oriented to project downward onto the workpiece 14. The laser assembly cap 102 has a pair of slotted holes 104 through which two screws 106, 108 pass to anchor the cap 102 to the housing 100. By loosening the screws 106, 108, the laser assembly cap 102 can be rotated so that the optical alignment marker 12 may be moved on the workpiece 14 along an axis perpendicular to the blade 36, illustrated by arrows "S".

The pivot pin 88 extends through an opening 110 in the front of the laser assembly cap 102, which allows the laser barrel 86 to be rotated within the housing 100. Rotation of the laser barrel 86 via the pivot pin 88 allows adjustment of the parallelism of the optical alignment marker 12 with respect to the blade 36, illustrated by arrows "R".

The housing 100 has a series of slide grooves 112 which engage with a pair of slide rails 114 on a slide plate 116. The slide plate 116 is mounted inside the upper blade guard 48. By pressing the left push knob 70 or right push knob 68 (See FIG. 1), the operator can move the light projection system 56 laterally in the direction "L". The lateral movement of the light projection system 56 allows the alignment marker 12 to be located on either side of the blade 36. In its preferred operation, the light projection system 56 is pressed completely to one side or the other until it engages the end stops. However, it will be appreciated that the lateral adjustment system of the present alignment invention permits the light projection system 56 to be located at any position along the travel of the slide plate 116.

The housing 100 is mounted to the slide plate 116 by a pair of housing screws 118, 120 which pass through a pair of laterally slotted openings 122, 124 that allow the housing 100 to be moved in the lateral direction. Preferably, a pair of biasing springs 126 are interposed between the slide plate 116 and the housing 100 to secure the light projection system 56 at a particular location. The biasing springs 126 preferably generate approximately 8 lbs. of force. It will be understood by those skilled in the art that a variety of systems could be used to retain the light projection system 56 in a particular position. It also will be appreciated that the light projection system 56 of FIG. 3 may be enclosed within an exterior housing (not shown) so that it may be attached to any suitable surface on a miter saw.

Because circular saw blades rotate at high speeds, the width of the cut in the workpiece made by the blade 36 will reflect the maximum width of the blade. For example, if the saw blade is not perfectly flat, or one or more teeth on the blade project out from the nominal plane defined by the side of the blade, the cut in the workpiece will be wider than the nominal width of the blade. One advantage of the present invention is that the highly visible alignment marker of the light projection system 56 may be easily adjusted so that it is tangent to a plane defined by the widest portion of the blade, rather than the nominal plane of the blade.

Figure 4:
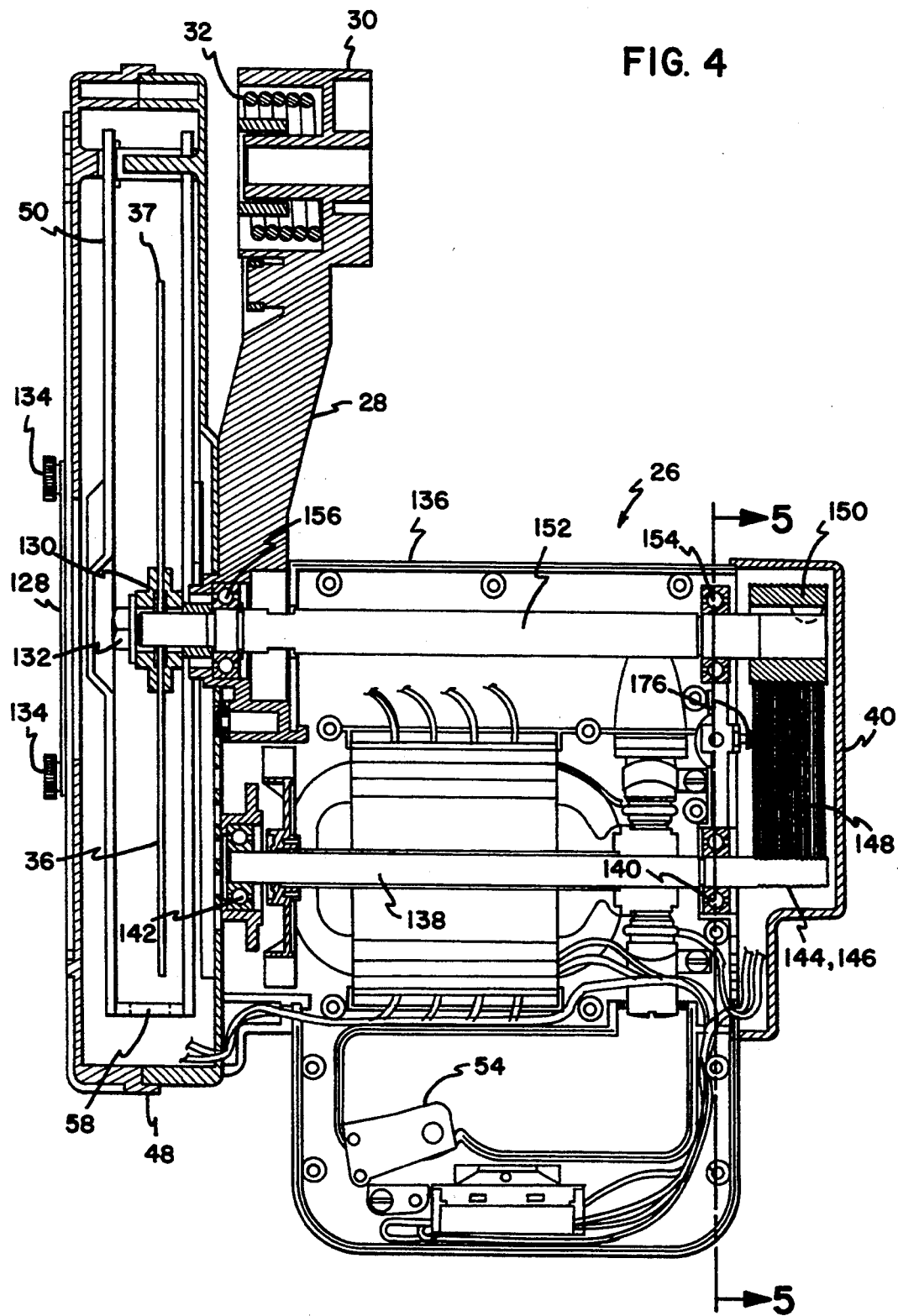
FIG. 4 illustrates a top sectional view of a preferred belt-driven miter saw with an adjustable pulley system.

FIG. 4 illustrates a top sectional view of preferred miter saw 10 having a blade 36 with a width 37. As discussed above, the preferred support spring 32 is located internally to the support coupling 30. However, it will be understood that a variety of configurations are possible. For applications in which a lower blade guard is applicable, FIG. 4 also illustrates a slit 58 in the lower blade guard 50 through which the optical alignment marker 12 preferably passes. A cover plate 128 is included on the upper blade guard 48 for providing access to a blade flange 130 and blade bolt 132. The cover plate 128 is held secure to the upper blade guard 48 by a pair of thumbscrews 134.

The preferred motor 34 contained within a motor housing 136 has an elongated motor shaft 138 supported by a pair of motor shaft bearings 140, 142. One end of the shaft preferably has a series of machined grooves 144 that operate as a motor pulley 146 for engaging a drive belt 148. The outside diameter of the preferred motor pulley 146 is 0.468".

A blade pulley 150 is coupled to the blade 36 by an elongated blade shaft 152. The outside diameter of the blade pulley is preferably 1.410" and contains a series of grooves which correspond to the motor pulley 146. The blade shaft 152 is also supported by a pair of blade shaft bearings 154, 156. The elongated motor and blade shafts 138, 152 provide support to counteract the torque caused by the drive belt 148. The motor pulley 146 and blade pulley 150 combination preferably provides a 3:1 reduction. The motor 34 preferably runs at between 17,000-19,000 rpm's and the 3:1 reduction of the pulleys 138, 152 causes the blade 36 to run at a no-load speed of approximately 5600 rpm's.

The blade 36 is anchored to the blade shaft 152 by the blade flange 130 and blade bolt 132. Underwriters Laboratories specifies that the blade flange 130 must be at least 1.75" in diameter. In the preferred embodiment of the pulley system invention, the portion of the blade housing 40 proximate the blade pulley 150 is generally the same diameter as the blade flange 132 so that the blade pulley 150 and belt housing 40 do not reduce the cutting radius of the blade 36.

It will be understood by those skilled in the art that the small diameter of the motor pulley 146 will create extreme heat on the drive belt 148. Applicants have found that a drive belt 148 constructed of Kevlar ® (low yarn density) provides large force transmission without being damaged by the corresponding heat. The preferred belt of the present invention is available from Circular Technologies of Boulder, Colo.

Figure 5:
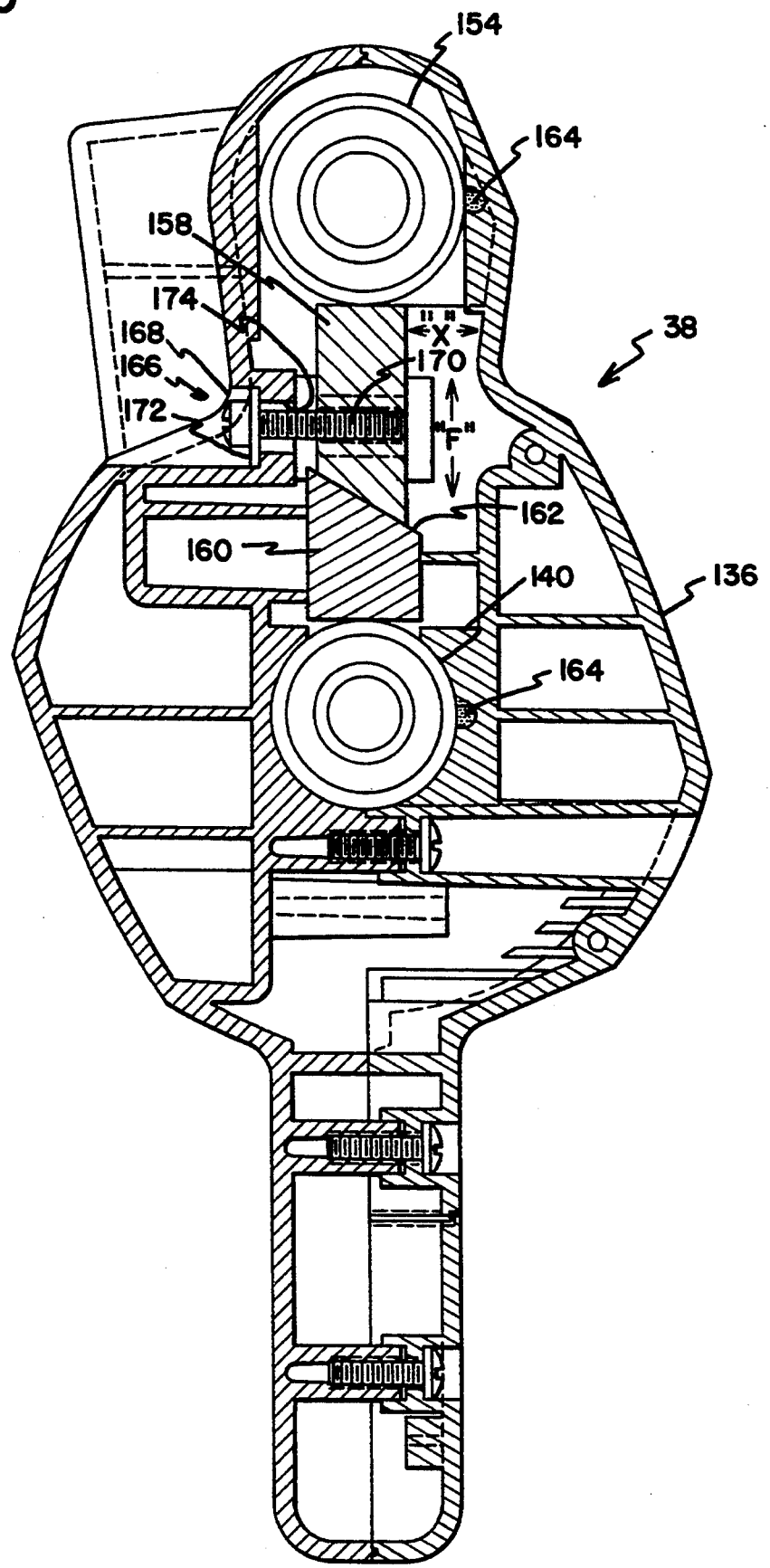
FIG. 5 illustrates a sectional view of a preferred adjustment mechanism for use with a motorized belt-driven miter saw.

Turning now to FIG. 5, which is a sectional view of FIG. 4, the preferred pulley tensioning system 38 comprises a first rigid member 158 and a second rigid member 160 with opposing beveled surfaces 162 interposed between the blade bearing 154 and the motor bearing 140. The second rigid member 160 is preferably stationary. The first rigid member 158 is allowed to move in the direction "X" so that relative movement of the beveled surfaces 162 increases or decreases the force in the direction "F". Rubber plugs 164 are provided to secure the outer surface of the bearings 140, 142, 154, 156, to the motor housing 136.

A tension adjustment screw 166 having a head 168, a threaded portion 170 and a wear plate 172 may be attached to the first rigid member 158 through a slotted opening 174 in the motor housing 136. Rotation of the tension adjustment screw 166 in the clockwise direction moves the first rigid member 158 toward the head 168 of the tension adjustment screw 166, whereby the distance between the blade bearing 154 and the motor bearing 140 is increased. The wear plate 172 allows the tension adjustment screw 166 to move within the slotted opening 174. Referring again to FIG. 4, a set screw 176 with a nylon tip is provided to prevent the pulley tensioning system 38 from moving due to vibration.

In the preferred belt tensioning system 38, a total of 0.090" of adjustment is available. Approximately 0.060" is used for putting on or taking off the drive belt 148. The remaining 0.030" is available for tensioning the belt 148 as it stretches. It will be understood that the adjustment range of the belt tension system 38 may vary depending on the length and construction of the belt, the type of pulleys, etc.

Applicants have found that the tensioning system 38 of the present pulley system invention extends the life of the drive belt 148, since additional tension can be placed on the belt 148 as it wears and stretches over time. Further, belt tensioning system 38 allows the drive belts 148 to be manufactured to a looser tolerance, thereby decreasing its manufacturing cost.

Figure 6:
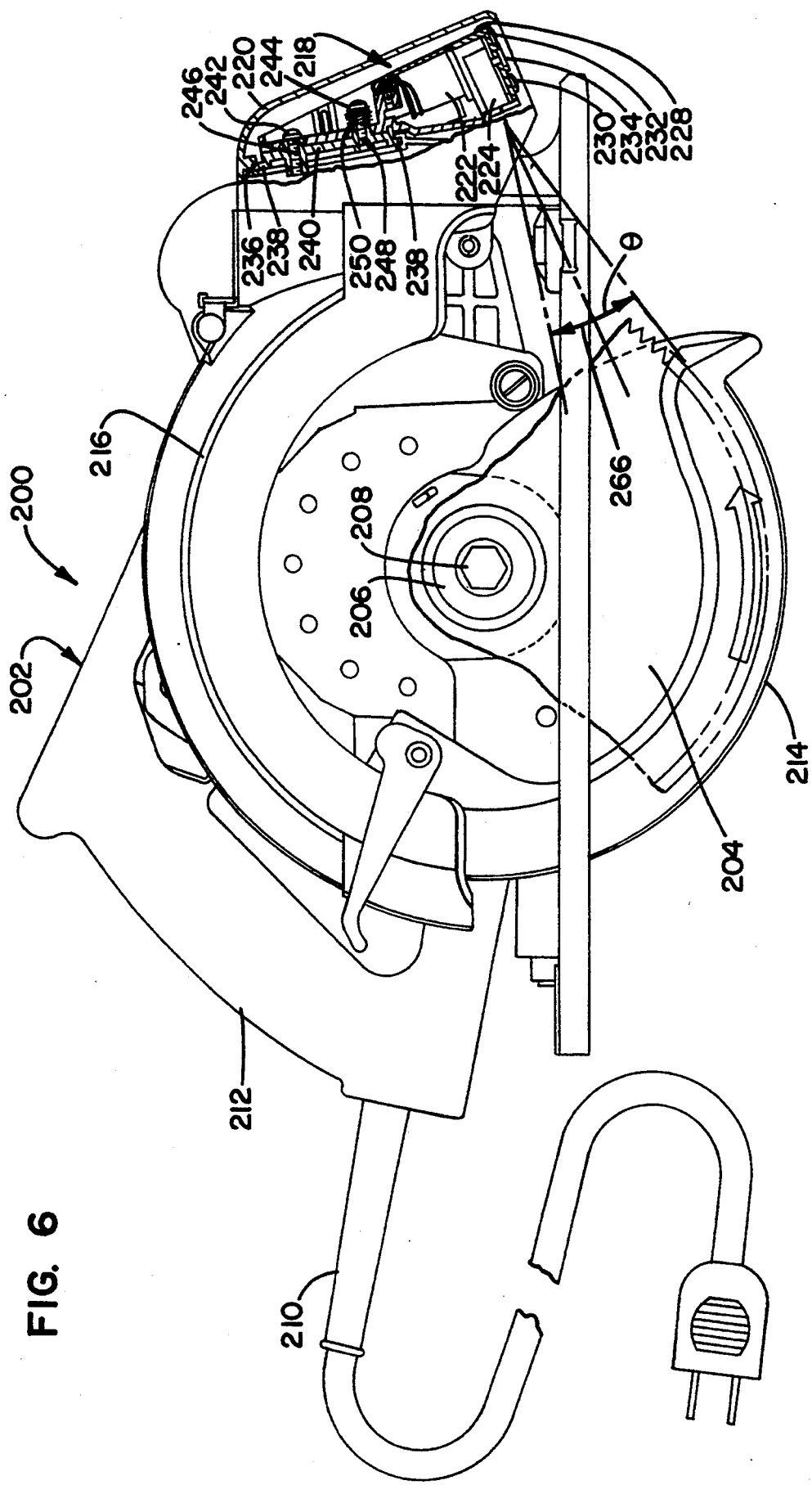
FIG. 6 illustrates a side view of the preferred hand-held circular power saw with the light projection system mounted on the upper blade guard.

In another embodiment, FIG. 6 illustrates a handheld circular saw utilizing the preferred light projection system of the present invention. The circular saw 200 is contained within a housing 202. A blade 204 is attached to a motor 207 (see FIG. 7) by a blade flange 206 and a blade nut 208. A power cord 210 is preferably attached to a handle 212 on the housing 202 for providing electric current to the motor (not shown).

The circular saw 200 preferably has a retractable lower blade guard 214 and a fixed upper blade guard 216. The light projection system 218 is preferably attached to the upper blade guard 216 toward the leading edge of the circular saw 200.

A light system housing 220 preferably protects the light projection system 218 from external environmental contamination. The light projection system 218 contains a control box 222 with the necessary electronics (not shown) for controlling operation of the laser source 224 and an adjustment mechanism similar to the adjustment mechanism 96 discussed above.

Preferred laser mechanism 224 is oriented to project a plane of light downward onto the workpiece (not shown) with one side of the beam of light facing and aligned with a plane defined by a selected side of the blade 204. The fan angle 266 is preferably large enough to project the alignment marker both in front of the blade 204 and along a portion of the blade 204 to insure proper alignment. The edge of the alignment marker corresponding to the side of the planar beam of light facing the blade then indicates where the selected side of the blade will enter the workpiece.

A laser assembly cap 228 contains a pair of slotted holes (not shown) through which two screws 230,232 pass to anchor the cap 228 to the light projection system 218. By loosening the screws 230, 232, the laser assembly cap 228 can be rotated so that the optical alignment marker may be moved on the workpiece along an axis perpendicular to the blade 204, as illustrated in FIG. 3 by the arrows "S".

A pivot pin 234 extends through an opening in the laser assembly cap 228, which allows the laser assembly 224 to be rotated. Rotation of the laser assembly 224 via the pivot pin 234 allows adjustment of the parallelism of the optical alignment marker with respect to the blade 204, as illustrated in FIG. 3 by the arrows "R".

The light projection system 218 has a series of slide grooves 236 which engage a pair of slide rails 238 on a slide plate 240. By pressing the left push knob 70 or right push knob 68 (see FIGS. 1 and 3), the operator can move the light projection system 218 laterally in the direction "L" as illustrated in FIG. 3. The lateral movement of the light projection system 218 allows the alignment marker to be located on either side of the blade 204. While the preferred adjustment mechanism 224 provides end stops to allow quick and easy movement of the light projection system 218 from one side of the blade 204 to the other, it will be understood by those skilled in the art that the light projection system 218 may be located at any position over its range of movement.

The slide plate 240 is mounted to the light projection system 218 by a pair of housing screws 242, 244 which pass through a corresponding pair of laterally slotted openings 246, 248. The laterally slotted opening 246, 248 allow the entire slide plate 240 to move along a fixed axis generally perpendicular to blade 204. Preferably, a bias spring 250 is interposed between the slide plate 240 and the head of the housing screw 244 to retain the light projection system 218 at a particular location.

Figure 7:
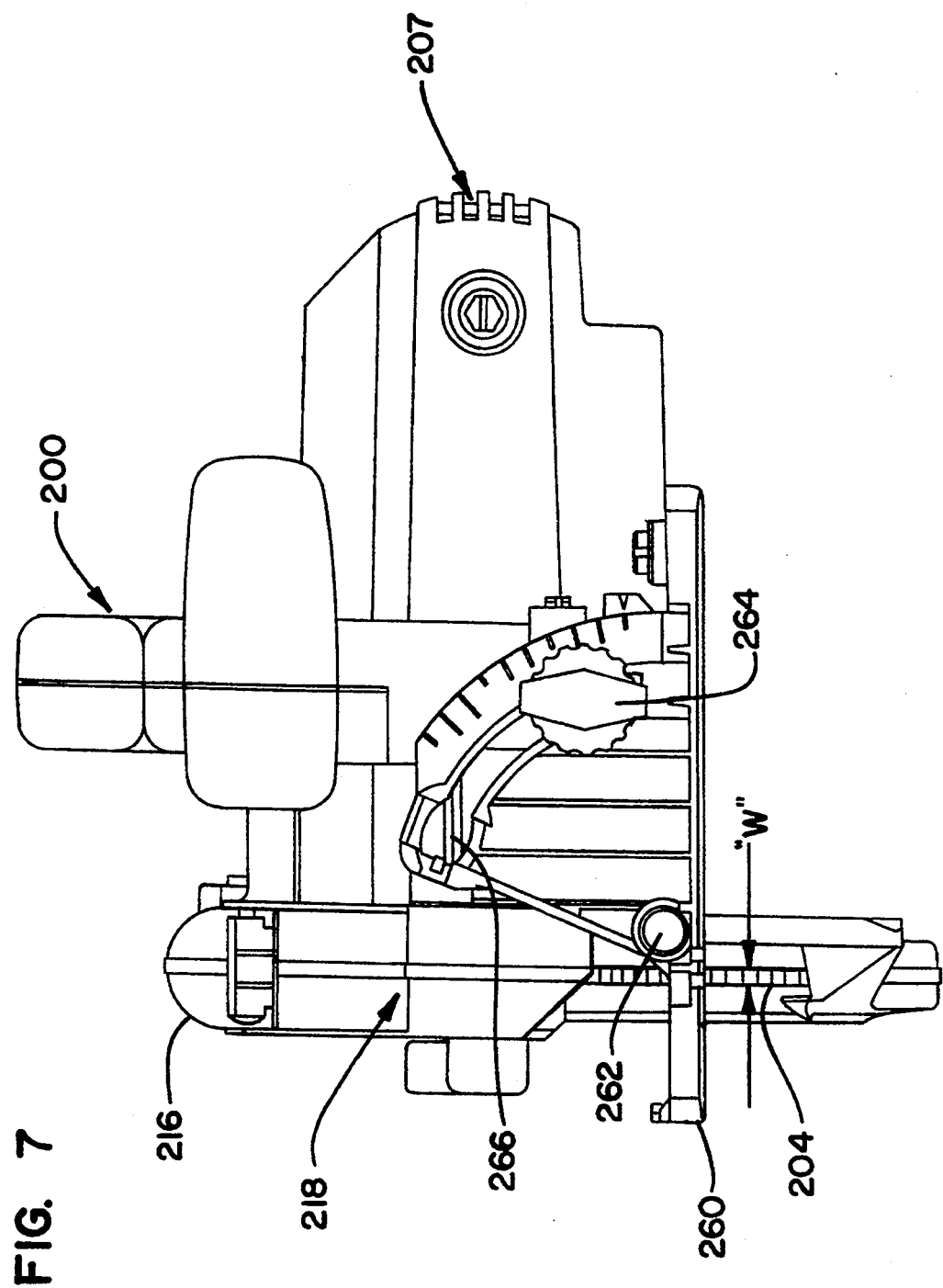
FIG. 7 illustrates a front view of the preferred hand-held circular saw with an adjustable base plate for making angular cuts in a workpiece.

FIG. 7 illustrates a front view of the hand-held circular saw 200 containing the light projection system 218. The blade 204 has a width "W" which extends below a base plate 260 for engagement with the workpiece.

The base plate 260 is pivotally attached to the housing 202 at a pivot point 262. By reducing the tension on the clamping nut 264, the base plate 260 can be rotated along the slot 266 to an angle of approximately 45° with respect to the blade 204. When the desired angle is reached, the clamping nut 264 is tightened to retain the base plate 260. Because the light projection system 218 is attached to the upper blade guard 216 of the circular saw 200, the relationship between the blade 204 and the light projection system 218 remains constant irrespective of the angle of the base plate 260.

As discussed above, the claimed light projection system is intended to be used with a variety of power saws utilizing circular blades. With respect to table saws or bench saws, it is preferable to attach the light projection system to an upper blade guard which maintains a fixed relationship with respect to the blade.

Attaching the light projection system to the upper blade guard is also ideal for use on compound or slide miter saws. Because the power saw can be rotated through a variety of planes relative to the workpiece, it is important that the light projection system maintain a constant relationship with respect to the blade. By doing so, the alignment marker always provides an accurate indication of the location at which one side of the blade will enter the workpiece.

It will be understood by those skilled in the art that the present inventions are not limited to the examples discussed above, but may be changed or modified without departing from the spirit or scope of the invention. It will be understood by those skilled in the art that a wide variety of circular saw configurations may incorporate the light projection system or adjustable pulley system of the present invention. Further, it will be recognized that the light projection system of the present alignment invention may be attached to any suitable surface on a circular saw.

We claim:

1. A power saw with an optical system for projecting an optical alignment marker onto a workpiece, comprising:
   a power saw housing;
   cutting means, generally contained within the housing, including a circular blade for cutting the workpiece, the blade having a radius, two sides, and a width;
   motor means for rotating the blade; and
   light projection means attached to the housing for projecting a coherent planar beam of light onto the workpiece in order to form a linear optical alignment marker on the workpiece, the light projecting means further comprising adjustment means for adjusting a position of the alignment marker in order to indicate a location at which the blade will enter the workpiece, the adjustment means comprising:
      lateral adjustment means for moving the position of the optical alignment marker laterally with respect to one of the sides of the blade; and
      means for rotating the position of the optical alignment marker on the workpiece in order to adjust the parallelism of the optical alignment marker with respect to one of the sides of the blade.

2. The apparatus of claim 1 wherein the power saw comprises a hand-held circular saw.

3. The apparatus of claim 1 wherein the power saw comprises a miter saw having a turntable.

4. The apparatus of claim 3 wherein the length of the linear alignment marker generally corresponds to the distance from a front to a rear portion of the turntable when the blade is in a raised position.

5. The apparatus of claim 1 wherein the cutting means includes an upper blade guard and the light projection means is attached to the upper blade guard.

6. The apparatus of claim 1 wherein the light projection means comprises a laser for projecting the coherent beam of visible light.

7. The apparatus of claim 6 wherein the laser includes optical means comprising a line generator for converting the beam into the linear alignment marker having generally linear configuration substantially parallel to the blade.

8. The apparatus of claim 1 wherein the adjustment means includes means for adjusting the spacial relationship between the optical alignment marker and the blade.

9. The apparatus of claim 1 wherein the lateral adjustment means comprises slide means for sliding the light projection means laterally.

10. The apparatus of claim 1 wherein the lateral adjustment means includes biasing means for securing the light projection means at a particular location.

11. The apparatus of claim 1 wherein the lateral adjustment means includes end stops to limit the lateral movement of the light projection means.

12. A power saw with an optical system for projecting an optical alignment marker onto a workpiece, comprising:
   a power saw housing;
   cutting means generally contained within the housing including a circular blade for cutting the workpiece, the blade having a radius, two sides, and a width determined by teeth projecting from the blade, and motor means for rotating the blade, the maximum projection of the teeth along each side of the blade defining a corresponding blade side plane; and
   light projection means located proximate to the cutting means for projecting a coherent planar beam of visible light past one of the sides of the blade and onto the workpiece in order to form a linear optical alignment marker on the workpiece along the one side of the blade, the linear optical alignment marker having a thickness and two sides, the light projection means further comprising adjustment means for selectably adjusting the position of the alignment marker so that the side of the alignment marker facing the one side of the blade is coincident with the corresponding blade side plane, the adjustment means comprising:
      lateral adjustment means for moving the position of the optical alignment marker laterally with respect to one of the sides of the blade; and
      means for rotating the position of the optical alignment marker on the workpiece in order to adjust the parallelism of the optical alignment marker with respect to one of the sides of the blade,
   whereby the side of the linear optical alignment marker that is coincident with the blade side plane designates the location at which the maximum projection of the teeth along the one side of the blade will enter the workpiece.

13. The apparatus of claim 12 wherein the cutting means includes an upper blade guard and the light projection means is attached to the upper blade guard.

14. The apparatus of claim 12 wherein the light projection means comprises a laser for projecting the coherent beam of visible light.

15. The apparatus of claim 14 wherein the laser includes optical means comprising a line generator for converting the beam into the linear alignment marker.

16. The apparatus of claim 12 wherein the adjustment means includes means for adjusting the spacial relationship between the optical alignment marker and the blade.

17. The apparatus of claim 12 wherein the lateral adjustment means comprises slide means for sliding the light projection means laterally.

18. The apparatus of claim 17 wherein the lateral adjustment means includes end stops to limit the lateral movement of the light projection means.

19. A power saw with an optical system for projecting an optical alignment marker onto a workpiece, comprising:
  a power saw housing;
  cutting means generally contained within the housing including a circular blade for cutting the workpiece, the blade having a radius, two sides, and a width determined by teeth projecting from the blade, and motor means for rotating the blade, the maximum projection of the teeth along each side of the blade defining a corresponding blade side plane; and
  light projection means located proximate to the cutting means for projecting a coherent beam of light past one of the sides of the blade and onto the workpiece in order to form an optical alignment marker on the workpiece, the light projection means further comprising adjustment means for adjusting the position of the beam of light so that a selected portion of the alignment marker is coincident with the blade side plane defined by the adjacent side of the blade, wherein the alignment marker portion that is coincident with the adjacent blade side plane designates the location at which the adjacent side of the blade will enter the workpiece, the adjustment means comprising:
  lateral adjustment means for moving the position of the optical alignment marker laterally with respect to one of the sides of the blade; and
  means for rotating the position of the optical alignment marker on the workpiece in order to adjust the parallelism of the optical alignment marker with respect to one of the sides of the blade.

20. The apparatus of claim 19 wherein the alignment marker comprises a series of dots designating the location at which the adjacent side of the blade will enter the workpiece.

21. The apparatus of claim 19 wherein the alignment marker comprises an arrow, a tip of which designates the location at which at least the adjacent side of the blade will enter the workpiece.

* * * * *

UNITED STATES PATENT AND TRADEMARK OFFICE
CERTIFICATE OF CORRECTION

PATENT NO. : 5,375,495

DATED : December 27, 1994

INVENTOR(S) : BOSTEN ET AL.

It is certified that errors appear in the above-identified patent and that said Letters Patent is hereby corrected as shown below:

In column 5, line 18, delete "an upper" after the word "by".
In column 5, line 19, delete "an" after the word "and".
In column 5, line 19, insert --74-- after the word "stop".
In column 6, line 14, insert --72, 74-- after the word "stops".

Signed and Sealed this

Twelfth Day of September, 1995

Attest:

BRUCE LEHMAN

*Attesting Officer*  *Commissioner of Patents and Trademarks*